United States Patent
Topchiyski (12) 
(10) Patent No.: US 8,793,289 B2
(45) Date of Patent: Jul. 29, 2014

(54) METHOD AND SYSTEM FOR DETECTING MEMORY LEAKS AND COPYING GARBAGE COLLECTION FILES

(75) Inventor: Krasimir I. Topchiyski, Sofia (BG)

(73) Assignee: SAP AG, Walldorf (DE)

( * ) Notice: Subject to any disclaimer, the term of this patent is extended or adjusted under 35 U.S.C. 154(b) by 1143 days.

(21) Appl. No.: 11/413,800

(22) Filed: Apr. 28, 2006

(65) Prior Publication Data

US 2007/0255774 A1 Nov. 1, 2007

(51) Int. Cl.
*G06F 17/30* (2006.01)
*G06F 11/07* (2006.01)
*G06F 12/02* (2006.01)

(52) U.S. Cl.
CPC ........ *G06F 11/0751* (2013.01); *G06F 11/0709* (2013.01); *G06F 11/073* (2013.01); *G06F 12/0253* (2013.01); *G06F 11/0718* (2013.01)
USPC ......................................................... 707/813

(58) Field of Classification Search
CPC .......................... G06F 12/0253; G06F 11/0751
USPC .......................................... 707/813, 999.206
See application file for complete search history.

(56) References Cited

U.S. PATENT DOCUMENTS

| | | | |
|---|---|---|---|
| 5,819,292 A * | 10/1998 | Hitz et al. ...................... | 707/203 |
| 6,453,325 B1 * | 9/2002 | Cabrera et al. ................. | 707/204 |
| 6,651,062 B2 | 11/2003 | Ghannam et al. | |
| 6,658,652 B1 | 12/2003 | Alexander, III et al. | |
| 6,865,657 B1 * | 3/2005 | Traversat et al. ............. | 711/170 |
| 6,957,237 B1 | 10/2005 | Traversat et al. | |
| 7,062,519 B2 | 6/2006 | Garthwaite | |
| 7,069,281 B2 * | 6/2006 | Garthwaite ................... | 707/206 |
| 7,231,412 B2 * | 6/2007 | Hitz et al. ...................... | 707/205 |
| 2005/0204341 A1 | 9/2005 | Broussard | |
| 2006/0129992 A1 * | 6/2006 | Oberholtzer et al. ......... | 717/124 |
| 2006/0143537 A1 * | 6/2006 | Grey .............................. | 714/38 |
| 2007/0256087 A1 * | 11/2007 | Forin et al. .................... | 719/332 |

OTHER PUBLICATIONS

Non-Finale Office Action for U.S. Appl. No. 11/413,801 Mailed Nov. 28, 2008, 12 pages.

* cited by examiner

*Primary Examiner* — Aleksandr Kerzhner
(74) *Attorney, Agent, or Firm* — Schwegman, Lundberg & Woessner, P.A.

(57) ABSTRACT

A system and method are provided to inspect memory leaks and copy garbage collection files. In one embodiment, an original garbage collection file is selected from a plurality of garbage collection files at a file system. The original garbage collection file is periodically copied into a duplicate garbage collection file. The duplicate garbage collection file serves as a backup file to the original garbage collection file.

8 Claims, 7 Drawing Sheets

METHOD AND SYSTEM FOR DETECTING MEMORY LEAKS AND COPYING GARBAGE COLLECTION FILES

FIELD

Embodiments of the invention relate generally to the field of data processing systems. More particularly, the embodiments of the invention relate to inspecting memory leaks and copying garbage collection files.

BACKGROUND

A memory on any computing system is a limited resource. No matter how fast computing systems become, they always depend upon a finite amount of memory in which to run their software applications. As a result, software developers should consider this resource when writing and developing software applications.

The Java programming language differs from many traditional programming languages (e.g., C, C++, C#) by the way in which memory is allocated and deallocated. In languages like C, C++ and C#, memory is explicitly allocated and deallocated by the application programmer/developer. This can greatly increase the time spent by programmers in tracking down coding defects in regards to deallocating memory.

By contrast, the Java runtime environment (e.g., Java virtual machine) provides a built-in mechanism for allocating and deallocating memory. In Java, memory is allocated to objects. The Java virtual machine ("VM" or "JVM") automatically handles the amount and allocation of memory upon an object's creation. The Java runtime environment employs a "garbage collector" ("GC") to reclaim the memory allocated to an object that is no longer needed. Once the GC determines that the object is no longer accessible (e.g., when there is no longer any references to it stored in any variables, the fields of objects, or the elements of any arrays, etc.), it reclaims the allocated memory. When objects in a Java application are no longer referenced, the heap space the object occupied is to be recycled so that the space becomes available for subsequently-created objects.

Although having garbage collection improves productivity, it is not entirely immune from a class of bugs, called "memory leaks." A memory leak can occur when a program (or in the case of Java, the VM) allocates memory to an object but never (or only partially) deallocates the memory when the object is no longer needed. As a result, a continually increasing block of memory may be allocated to the object, eventually resulting in an "Out Of Memory Error" ("OOME"). In other words, a memory leak occurs when memory is allocated, but never (or only partially) reclaimed. Memory leaks can also occur when a data structure (e.g., hashtable) is used to associated one object with another and even when neither object is required any longer, the association with the data structure remains, preventing the objects from being reclaims until the data structure is reclaimed. Stated differently, when a lifetime of the data structure is longer than that of the objects associated with it, memory leaks are caused.

Memory leaks are of particular concern on Java-based systems (e.g., Java 2 Platform Enterprise Edition ("J2EE") platforms) which are to run twenty-four hours a day, seven days a week. In this case, memory leaks, even seemingly insignificant ones, can become a major problem. Even the smallest memory leak in code that runs 24/7 may eventually cause an OOME, which can bring down the VM and its applications.

Knowing how to track down memory leaks is essential to having a solid program design. There are many performance and/or debugging tools that are used to monitor and examine software applications to determine resource consumption within the Java runtime environment. For example, a profiling tool may identify the most frequently executed methods and objects created in an application. Another type of software performance and debugging tool is a "tracer." However, such tools are very limited in detection of memory leaks, while consuming great amounts of system resources by requiring starting and restarting of VMs in special modes. Further, such tools are also limited in providing information on how the memory leaks occur. This leaves developers with often insurmountable amounts of code to manually evaluate to find the specific class and method calls, etc. Moreover, although these tools may provide certain statistics on the memory allocation for objects within a running application, such information may not be useful for an application that comprises several thousand objects.

The conventional tools (e.g., Optimizelt, JProbe, etc.), when used, require restarting of VMs and the server, which results in loss of production and system resources, particularly when restarting a productive system. Moreover, the restarting of the server and its VMs further adds to the system overhead by increasing memory consumption which also harms the normal work of the server and server software. Furthermore, these tools require manual interaction with regard to the functioning of the GC, which is not only tedious in nature, but also results in loss of previously-collected profiling information each time an OOME occurs.

SUMMARY

A system and method are provided to inspect memory leaks and copy garbage collection files. In one embodiment, an original garbage collection file is selected from a plurality of garbage collection files at a file system. The original garbage collection file is periodically copied into a duplicate garbage collection file. The duplicate garbage collection file serves as a backup file to the original garbage collection file.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Java applications can vary in both size and complexity. In addition, certain large Java application (e.g., ~10,000 classes and ~1,000,000 methods with ~100,000,000 method calls) may run 24/7 ("long living" applications). Within a long living application, memory leaks can become major problems in terms of both stability and performance. For example, a single long living object that increases in size by 1 byte between each GC cycle will eventually cause the application and VM to crash due to an OOME. Although such a crash may take a long time (e.g., 1 bytes per GC cycle*millions of free bytes of memory), it will inevitably occur.

As described above, existing monitoring tools can identify objects that are growing in size. However, if an application contains 1000s of objects and classes, such information can be useless without a significant amount of manual analysis. Merely knowing which object or objects are responsible for leaking is one thing, but the process by which that knowing is obtained is another thing. Nevertheless, it is merely a start, and a developer is then typically required to analyze a significant amount of data to determine where exactly in the code the leak is occurring (e.g., within which specific classfile).

Figure 1:
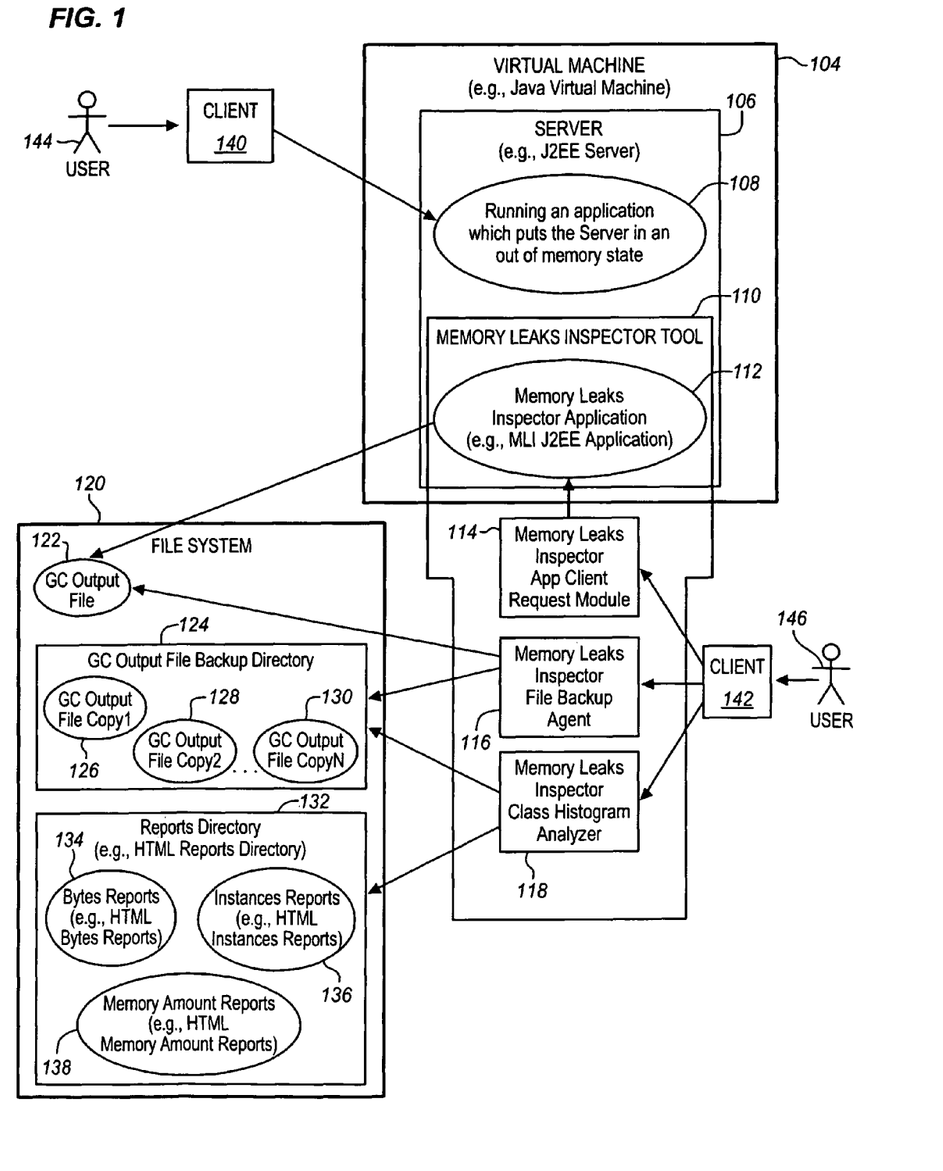
FIG. 1 illustrates an embodiment of a memory leak inspector tool.

FIG. 1 illustrates an embodiment of a memory leak inspector tool 110. As illustrated memory leak inspector (MLI) tool 110 may reside wholly or partially at a server 106, such as J2EE server, which resides at a virtual machine (VM) 104, such as Java VM (JVM). Client 102 refers to one or more clients of J2EE application 108 that runs at J2EE server 106. Client 102 may request to run J2EE application 108. The running of J2EE application 108 may load J2EE server 106 and provoke an OOME.

When a large computing system such as an enterprise application server, such as J2EE server 106, starts up, there are numerous components that must be loaded. Potentially, the startup of a given computing system could load ~10,000 classes, ~100 services, and ~100,000 methods. Even on a high-powered computing system, such a boot sequence may require many minutes to complete. Once such a large computing system is running, an undiscovered memory leak may trigger an OOME. Depending on the gradient of the memory leak, the time before such an error occurs may vary greatly. For example, a memory leak that increases by 1 byte per minute may take years to occur, whereas a memory leak that increases 1 MB per minute may occur within minutes or hours. OOMEs are more likely to occur on production systems under heavy load when it can be extremely unproductive and even unacceptable to restart server 106 and VM 104 and hence, the system.

To avoid restarting the system, including VM 104 and server 106, MLI tool 110 is employed. As illustrated, MLI tool 110 monitors and analyzes a runtime environment (e.g., VM 104) and the garbage collection therein as requested and/or predetermined by the user to help eliminate the need for restarting of the system to identify and prevent memory leaks. When VM 104 has run out of available memory, it displays an OOME. MLI tool 110 captures relevant information (e.g., allocated memory of objects, currently method calls waiting for memory to create objects, etc.) that may give an insight into objects causing memory leaks that existed before the occurrence of the OOME by having the garbage collector at VM 104 produce GC output file 122. For example, GC output file 122 contains class histograms (histograms) that contain histogram tables (tables) containing the relevant information, which, upon analyzing and comparing of the class histograms, shows the user which components (e.g., classes and its associated objects) were using memory at the time of the OOME. Next, GC output file 122 is dumped into file system 120 and then copied one or more times into GC output file copies 126-130 as predetermined and requested by the user. Once a copy 126-130 is made, the histograms are analyzed and compared using various calculation techniques, resulting in a variety of reports 134-138 to provide an indication of the object associated with the class responsible for causing a memory leak. These processes are performed without restarting the system.

In one embodiment, an MLI application 112, such as an MLI J2EE application, is deployed via MLI tool 112 further via server 106 residing at VM 104. In the illustrated embodiment, MLI application 112 is part of MLI tool 110 and resides at VM 104. MLI application 112 includes a lightweight J2EE application to help analyze the memory consumption and identify memory leaks in server 106 without having to restart the corresponding VM 104 in special mode. This technique helps maintain the system performance, as without having to restart VM 104, the system performance is not compromised, particularly of those systems that are productive. Furthermore, no additional hardware is needed to use MLI application 112.

In one embodiment, MLI application 112 runs at VM 104 to provide the functionality for requesting VM 104 to facilitate producing, including printing, of its current memory status via the so-called class histograms in GC output file 122 residing at file system 120. The class histograms contain class histogram tables which contain relevant memory leak information. For example, the tables contain detailed information about the Java memory heap usage, such as (1) the number of objects of a certain Java type are allocated in the memory, and (2) the amount of memory that is allocated by a certain object type. The request for GC output file 122 having histograms may be made via a module, such as request module 114, which may be part of MLI tool 110. Although, request module 114 is part of MLI tool 110, it may or may not reside at VM 104 and/or server 106.

Client 142 may place a request via request module 114 to have MLI application 112 to provide histograms via GC output file 122. This request may be made once or multiple time or done periodically at a predetermined time or time intervals to continuously produce GC output file 122 at predetermined time intervals. First, a garbage collector at VM 104 may be invoked to release the memory allocated for already unaccessible object instances. Then, MLI application 112 is accessed via request module 114 to request the garbage collector to produce VM class histograms via GC output file 122 at file system 120. The process of producing histograms may continue at predetermined intervals such that a serious of subsequent histograms are provided so that these histograms within GC output file 122 can be compared and analyzed to determine classes, and more particularly objects associated with such classes, that are responsible for memory leaks. Objects may include clean objects and dirty objects. The dirty objects refer to the objects that are responsible for memory leaks and are associated with the class that is regarded as the one causing the memory leaks. In one embodiment, this determination is made without having to restart VM 104 which saves system resources and prevents a system from becoming less productive even temporarily.

In one embodiment, MLI tool 112 further includes an agent, such as MLI file backup agent (agent) 116, which is accessible by client 142 to request GC output file copies 126-130 of GC output file 122 to be provided at file system 120. These copies 126-130 are provided at GC output file backup directory (backup directory) 124 and can be made once or multiple times or periodically in accordance with predetermined time intervals as requested by client 142. Copies 126-130 are to save the printed class histograms of the parent GC output file 122 in case of an OOME, which can cause the parent GC output file 122 to be deleted. Client 142 can access and use agent 116 to set the predetermined time intervals and place a request with file system 120 via agent 116 to provide multiple copies 126-130 of GC output file 122 each time a predetermined time interval is reached. Copies 126-130 can also me automatically requested or made each time an event, including a predetermined event, is triggered (e.g., each time a new GC output file 122 is requested by MLI application 112 via request module 114.

MLI tool 110, in one embodiment, further includes an analyzer, such as MLI class histogram analyzer (analyzer) 118, to generate human-readable reports to provide the results of the histogram analysis. These human-readable reports may be provided in various formats, such as HyperText Markup Language (HTML), Extensible Markup Language (XML), and the like. In one embodiment, when a memory leak occurs, client 142 may initiate analyzer 118 against the backed up version (e.g., copies 126-130) of GC output file 122. Analyzer 118 then generates the results in the report format at reports directory (reports directory) 132 (e.g., HTML report directory); the format (e.g., HTML) or formats of which may be as requested or previously determined by client 142. These reports may include bytes report 134 (e.g., HTML bytes report), instances report (e.g., HTML instances report), and memory amount report (e.g., HTML memory amount report). These reports are generated based on various types of analyzing techniques to analyze histograms via analyzer 118. Such analyzing techniques, respective to the reports mentioned above, include bytes deviation percentage analysis, instances count deviation percentage analysis, and memory amount usage analysis.

MLI tool 110 having components and modules, such as MLI application 112, request module 114, agent 116, and analyzer 118, provides profiling of server components without having the need for starting or restarting their virtual machines 104 in any mode. This also helps prevent restarting corresponding servers 102, which is time and resource consuming and may not even be acceptable when a system is productive. This technique can also help prevent the possibility of server 106 running slow or crashing at restart which can make the memory leak investigation virtually impossible. MLI tool 110 is used for investigating and determining a slow memory growth in very long runs (e.g., over several days and even weeks) without relying on the restart or debug mode of JVM 104 and having server overhead and increasing memory consumption of server 106 (e.g., without harming the normal work of the server software).

In one embodiment, MLI tool 110 can be used without manual interaction, such the class histograms at GC output file 122 may be automatically generated and printed and then analyzed any time or any predetermined time or intervals after the run. In one embodiment, MIL tool 110 controls the garbage collector, such as via MLI application 112, which keeps the garbage collector efficient and in check and eliminates the need to manually start or restart the garbage collector. Furthermore, to avoid losing the memory leak-related profiling information (e.g., histograms) in case of an OOME, MIL tool 110, such as via agent 116, facilitates the replication of the contents of GC output file 122. MLI tool 110 is flexible as it can be deployed or attached to any running productive system without any additional hardware or the need to restart or the need for a change in the system behavior. Once deployed, MLI tool 110 can start monitoring objects and classes responsible for memory leaks, analyze profiling information, generate reports, and continue serving its clients 140, 142.

Any of MLI application 112, request module 114, agent 116, and analyzer 118 may or may not reside at JVM 104 or J2EE server 106. Also, clients 140, 142, although shown as separate clients may be the same client. On the other hand client 142, although shown as a single client may represent multiple clients. Clients 140, 142 include any client computer system that is accessible by a developer or administrator 144, 146. MLI tool 110 may further include a separate monitor or monitoring module to monitor the memory consumption to help produce the amount of data a developer 144, 146 a need to identify the specific code location within an application that is responsible for a memory leak, although the monitoring function may be performed by MLI application 112. Similarly, MLI tool 110 may contain an identifier or identification module for identifying or such function may be performed by analyzer 118 or even MLI application 112. In this embodiment, classes or specific subsets of classes responsible for memory leaks may be monitored and identified to know and eliminate the source(s) for such memory leaks.

In one embodiment, once a class has been shown to be free from memory leaks (e.g., the object or objects created based on the class do not grow over time), such class may be labeled for indication that the class is free from defects. Similarly, an application (e.g., Java Servlet application) may be labeled as free of memory leaks individually labeling each class with the application as being free from memory leaks. The application can be labeled and announced as free from memory leaks when running on a specific application server, such as J2EE server 106, in a specific runtime environment, such as JVM 104, or even before the application is outsourced to third parties.

In one embodiment, reports 134-136 and other relevant data and profiling information may be displayed via a graphical user interface (GUI) at a display device and/or stored within a database for subsequent retrieval and analysis. Although, for example, J2EE server 106, JVM 104, and MLI J2EE application 112 are illustrated for simplicity, it should be noted, however, that the underlying principles and embodiments of the present invention may be implemented within any type of object-oriented and runtime environments. Moreover, it should be noted that the memory requirements used in this example do not necessarily reflect the real values that the example program would actually produce.

In one embodiment, MLI application 112 invokes the GC before printing class histograms in response to each client request, but it can also invoke the GC multiple times to ensure that the garbage objects are really destroyed, i.e., the memory is clean. This technique is performed by checking the used VM heep memory size after each invocation of the GC to ensure that the decrease of the used memory is not to be changed anymore. For example, one reason for using this technique (e.g., invoking the GC more than once and checking the VM heap memory size) is that there are different VM implementations and, according to the relevant VM specification, a given VM implementation might not clean the memory immediately after it has been requested to do so. Thus, to be sure that a memory cleanup is provoked, the memory size is checked and the GC is invoked again, as necessary.

An example of a runtime system includes a VM, such as VM 104. A VM refers to an abstract machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. For example, a Java source program can be compiled into program code, such as bytecode. Bytecode can be executed on a VM, such as JVM 104, running on any processor or platform. The JVM can either interpret the bytecode one instruction at a time, or the bytecode can be further compiled for the real processor or platform using a just-in-time (JIT) compiler.

In the illustrated embodiment, for simplicity, JVM 104 is used as an example; however, other examples of VMs, which can be used in various embodiments, include Advanced Business Application Programming (ABAP) language VMs, Common Language Runtime (CLR) VMs, and the like. ABAP is a programming language for developing applications for SAP systems, such as SAP R/3 system, which is a widely installed business application system developed by SAP AG of Walldorf, Germany. The CLR is a managed code execution environment developed by Microsoft Corp. of Redmond, Wash. For purposes of simplicity, the discussion in this document focuses on virtual machines, and in particular Java virtual machine 104, but it is to be understood that the techniques described herein can also be used with other types of runtime systems.

A runtime system includes a code execution environment that executes instructions or code in user requests and that provides runtime services for that code. Code runtime services may include functionality, such as process, thread, and memory management (e.g., laying out objects in the server memory, sharing objects, managing references to objects, and garbage collecting objects). Enhanced runtime services may include functionality, such as error handling and establishing security and connectivity.

Garbage collection as described here includes a process designed to identify and reclaim blocks of memory that are dispensed by a memory allocator but are no longer "alive" or "live" (e.g., no longer being used, as determined, for example, by not being reachable from any currently referenced objects or entities). Garbage collection can sometimes be handled as a background task by runtime systems rather than as an explicit task by user programs. Garbage collection can also be handled as an inlined task. Garbage collection can be used to reclaim memory in runtime systems, and there are some well-known garbage collection algorithms (e.g., reference counting, mark-sweep, mark-compact, and copying algorithms).

Figure 2:
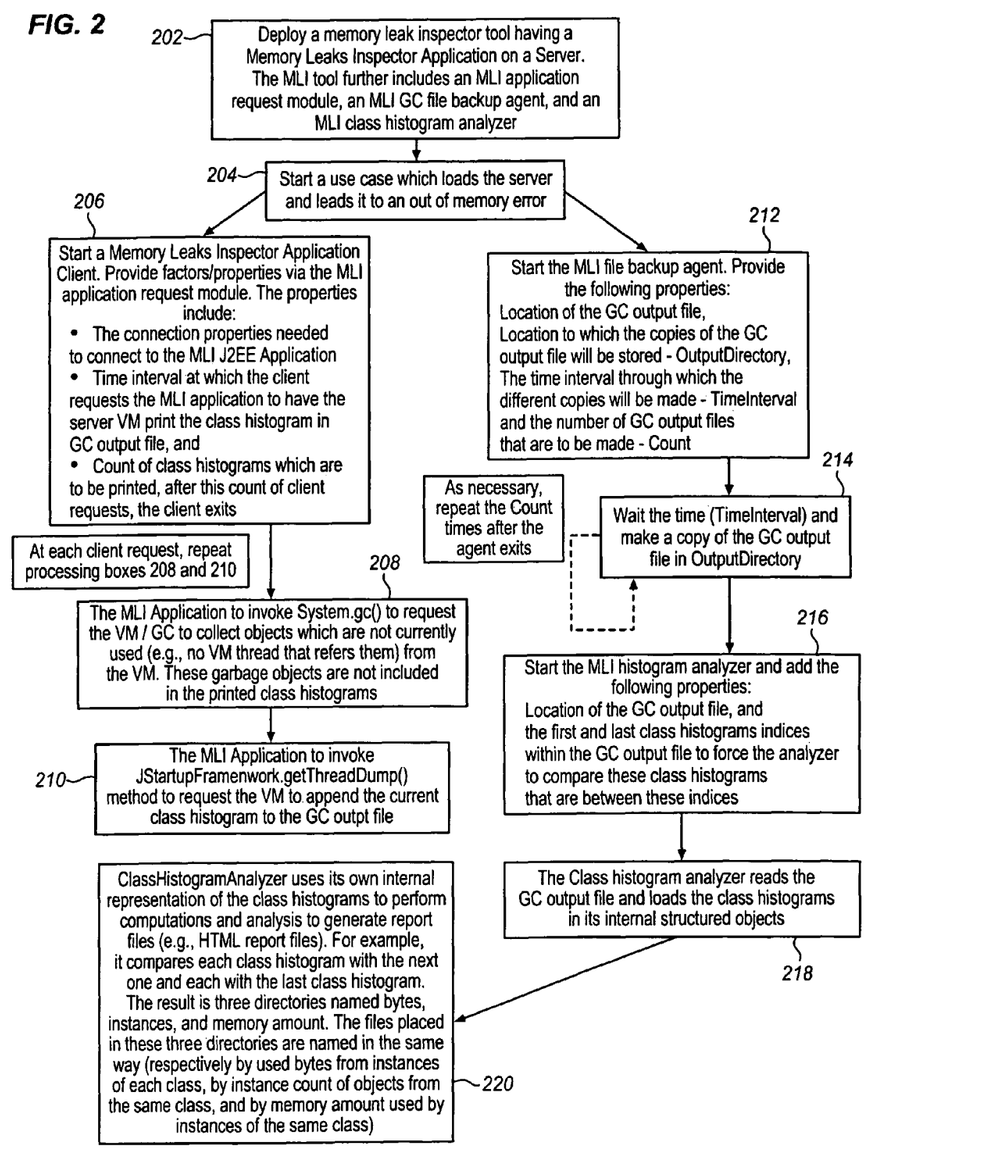
FIG. 2 illustrates an embodiment of a process for identifying memory leaks.

FIG. 2 illustrates an embodiment of a process for identifying memory leaks. In one embodiment, at processing block 202, an MLI tool including an MLI application (e.g., MLI J2EE application) is deployed on a server (e.g., J2EE server) residing at a virtual machine (e.g., JVM). At processing block 204, a use case is started which loads the server and leads to an OOME. The MLI application is then started at processing block 206.

As processing block 208, the MLI application invokes the system (e.g., System.gc( )) to facilitate or even compel a GC at the VM to collect the objects that are not currently used (e.g., there is no VM thread that refer these objects) from the VM. These garbage objects are not included in the produced class histograms. At processing block 210, the MLI application invokes a startup method (e.g., JStartupFramework.getThreadDump( )) to facilitate the JVM to append the current histogram to the GC output file. With each client request, processes at processing blocks 208 and 210 are repeated.

Referring back to processing block 204, with the starting of the use case, at processing block 212, the backup agent is started. The starting of the agent may include the developer via the client providing initial factors and/or parameters, such as (1) the location of the GC output file, (2) the location at which copies of the GC output file are to be stored (e.g., backup directory), (3) the time intervals at which copies of the GC output file are made (e.g., time intervals), and (4) the number of GC out file copies which to be made (e.g., count). At processing block 214, the agent is used such that the parent GC output file is copied at the assigned predetermined intervals (or events) for the preset number of counts and the copies placed in the backup directory.

Once at least one backup copy of the GC output file is available, and once the analyzer is started, additional factors and/or parameters may be provided at processing block 216. Such factors may provided by the developer via the client. The factors may include (1) the location of the GC output file, (2) the first and last histograms are indexed within the GC output file to facilitate the analyzer to compare the first and last histograms which are between these indices. At processing block 218, the analyzer reads the GC output file and loads the class histograms in the internal structured objects. The analyzer may use its own internal representation of the class histograms to perform computations and to generate report files (e.g., HTML reports) at processing block 220.

In one embodiment, the analyzer compares each histogram with the next histogram and further compares each histogram with the last histogram. The result of such comparison may provide three directories, including bytes directory, instances directory, and/or memory amount directory. The files placed in these directories may be named in the same manner or format and contain the data in the same format, but the data in these files may be stored in a different manner or format (e.g., by used bytes from instances of each class, by instance count of objects from the same class, and by memory amount used by instances of the same class).

Figure 3:
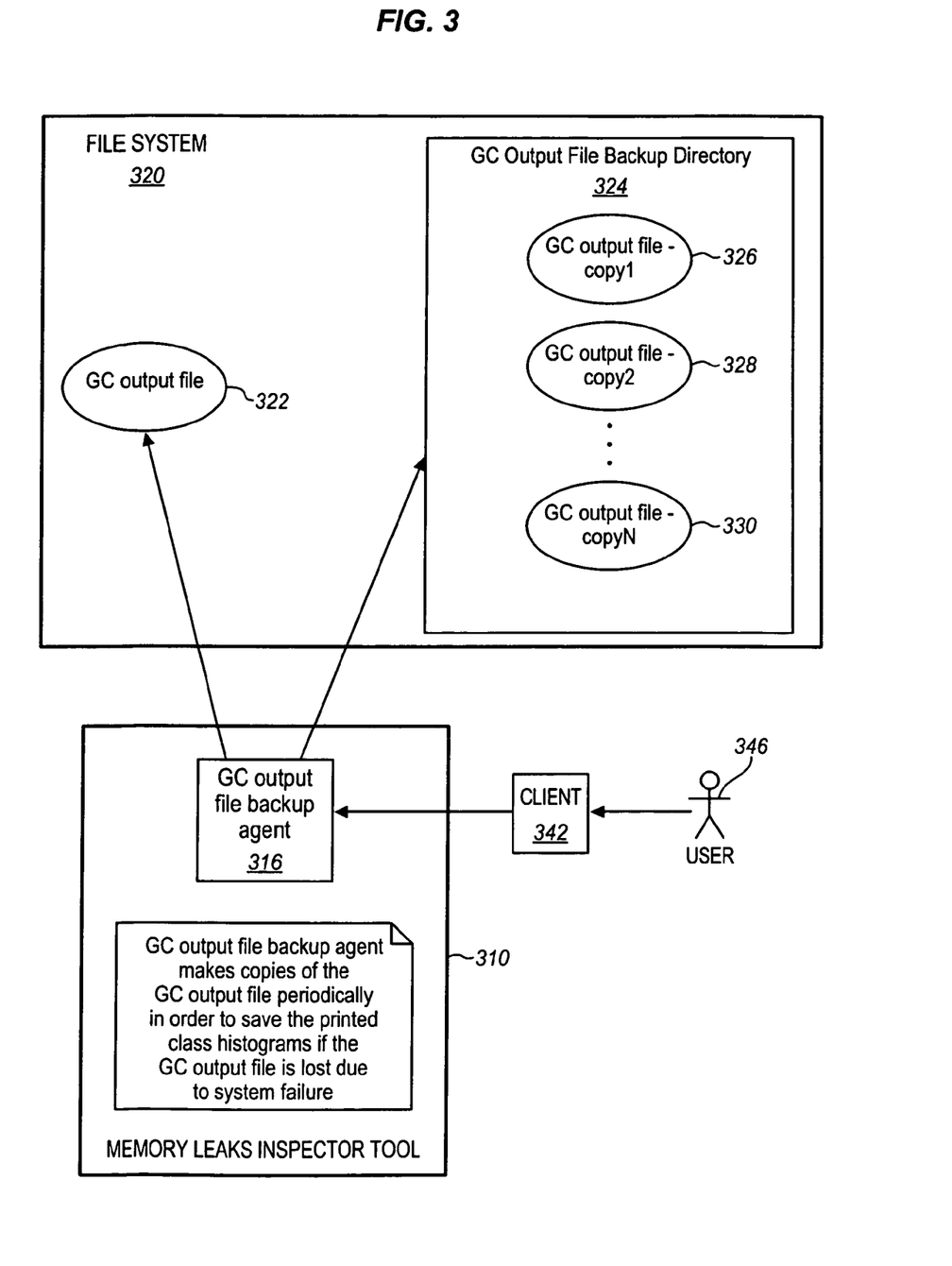
FIG. 3 illustrates an embodiment of a memory leaks inspector garbage collection output file backup agent.

FIG. 3 illustrates an embodiment of a memory leaks inspector garbage collection output file backup agent 316. In the illustrated embodiment, MLI tool 310 having GC output file backup agent 316 is deployed at a server or node (e.g., J2EE server) residing at a VM (e.g., JVM). However, MLI tool 310 may or may not be deployed at a J2EE-based server and/or a Java VM. In one embodiment, agent 116, which is accessible via client 342 such that user (e.g., developer, administrator, etc.) can request GC output file copies 326-330 of GC output file 322 to be provided at file system 320. These copies 326-330 may be produced, provided and/or printed at backup directory 324 at file system 320.

In one embodiment, user 346 may choose to have GC out file 322 copied merely once or multiple times as desired or necessitated. Copies 326-330 can also be made consistently and periodically in accordance with predetermined time intervals as requested by user 346 via agent 316 and via client 342. For example, user 346 may require agent 316 to make copies 326-330 each time a certain time interval is reached (e.g., every 2 hours on Mondays, Wednesdays and Fridays, every 6 hours on Tuesdays, every 8 hours on Thursdays, once at 12 noon on Saturdays, and no copies are to be made on Sunday, etc.) depending on, for example, how busy the system is going to be at certain time or on certain days. These time intervals may not be made permanent and can be changed as necessary or desired. For example, the 2 hour interval on Mondays can be changed to a smaller interval (e.g., every 15 minutes) or a longer interval (e.g., every 3 hours) and can also be entirely removed for any reason (e.g., Monday is going to be a slow day due to a holiday).

In addition to time intervals, agent 316 may also be used to produce copies 326-330 using various other criteria. For example, a copy may be automatically provided each time an event is reached (e.g., each time an MLI application via a request module requests a garbage collector to produce a new or update an existing GC output file). Any number of methods or criteria can be used to produce, provide, and print GC output file copies 326-330. This technique ensures that a copy of GC output file 322 is available and its contents are preserved and protected in case of an OOME or other system errors and/or failures. Copies 326-330, like the parent GC output file 322, include class histograms, which further include histogram tables, for later comparison and analysis via an analyzer at MLI tool 310 to determine those classes and their associate objects that are responsible for memory leaks. For example, the tables contain detailed information about the Java memory heap usage, such as (1) the number of objects of a certain Java type are allocated in the memory, and (2) the amount of memory that is allocated by a certain object type.

The comparison and analysis of histograms is done to determine classes and objects associated with such classes that are responsible for or associated with memory leaks. For example, objects associated with classes may include clean objects and dirty objects. The dirty objects refer to the objects responsible for a memory leak and are associated with the class that is regarded as the one causing the memory leak. In one embodiment, the providing of GC output file 312, the comparison of class histograms, and the determination of responsible classes and objects are performed without restarting the server and/or VM, which saves system resources and prevents a system from unnecessarily becoming less productive, even if only temporarily.

Figure 4:
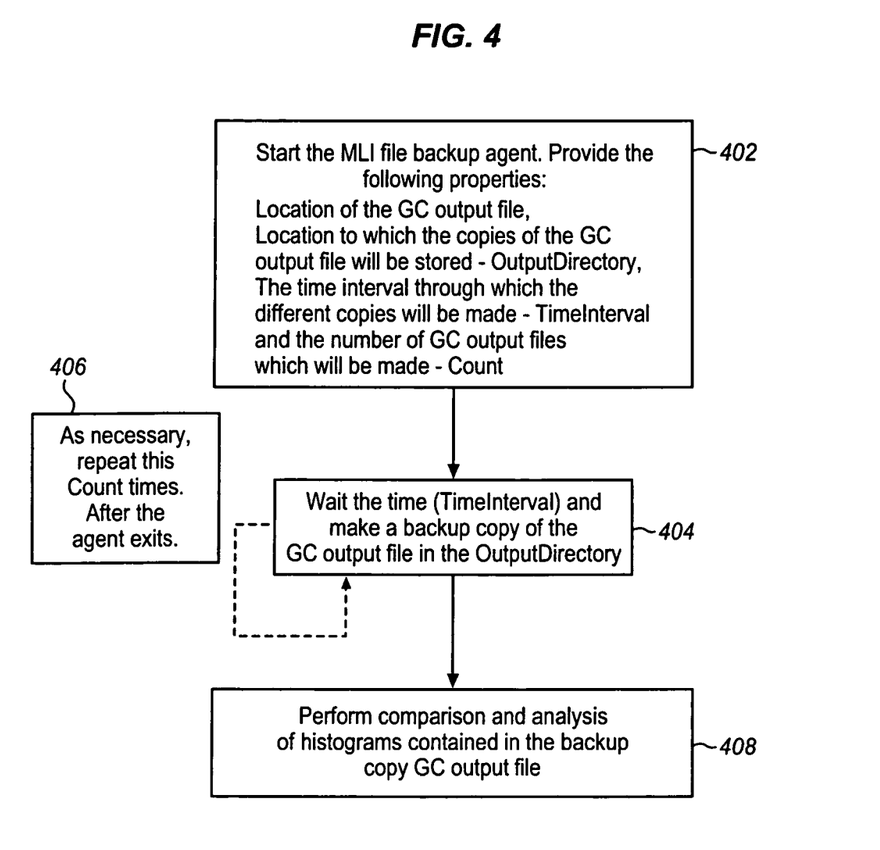
FIG. 4 illustrates an embodiment of a process for copying a garbage collection output file using a memory leak inspector backup agent.

FIG. 4 illustrates an embodiment of a process for copying a garbage collection output file using a memory leak inspector backup agent. In one embodiment, an MLI tool, including an MLI application, an MLI request module, a MLI file backup. agent, and an MLI class histogram analyzer, is deployed on a server (e.g., J2EE server) residing at a virtual machine (e.g., JVM). At processing block 402, with the starting of the use case at the server with running one or more J2EE engines, the backup agent is started. At the start of the agent, a user (e.g., developer/administrator) via a client provides initial factors and/or parameters, such as (1) the location of the GC output file, (2) the location at which copies of the GC output file are to be stored (e.g., backup directory), (3) the time intervals at which copies of the GC output file are made (e.g., time intervals), and (4) the number of GC out file copies which to be made (e.g., count).

At processing block 404, in one embodiment, the user via the backup agent at the MLI tool order copies of the parent GC output file at the assigned predetermined intervals or events. These copies placed in the backup directory at the file system. In one embodiment, at processing block 406, the various copies of the GC output file are made and repeated for the preset number of counts (e.g., as set forth the by the user via the agent) once the backup agent has exited. Once at least one copy of the GC output file is made available, histograms provided in the copy are compared and analyzed to determine the classes and associated object that are the cause of a memory leak at processing block 408.

Figure 5:
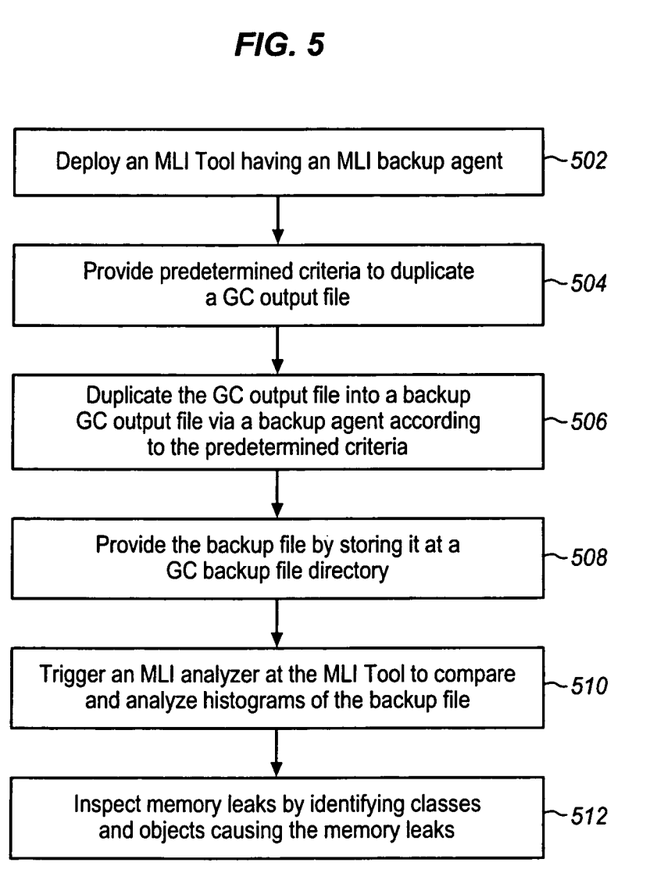
FIG. 5 illustrates an embodiment of a process for inspecting memory leaks using a memory leaks inspector.

FIG. 5 illustrates an embodiment of a process for inspecting memory leaks using a memory leaks inspector. At processing block 502, a memory leaks inspector tool is deployed at a server node (e.g., J2EE server) at a virtual machine (e.g., JVM). In one embodiment, the memory leaks inspector provides various components and modules to inspect the objects associated with those classes that cause memory leaks. The various components and modules include an MLI application (e.g., MLI J2EE application), an MLI application request module, an MLI file backup agent, an MLI class histogram analyzer, and the like.

In one embodiment, at processing block 504, once the MLI application has triggered a VM garbage collector to provide relevant information (e.g., memory leak-free classes, memory clean objects, and dirty objects, etc.) via a GC output file at a file system, a user (e.g., developer, administrator, etc.) may set predetermined criteria for copying the GC output file via the MLI backup agent. The GC output file may include VM class histograms, which further include histogram tables. The tables provide the relevant information necessary to seek and identify class and objects causing memory leaks without having to restart the VM or the server. The MLI application may provide the GC output file each time an event occurs or at predetermined time intervals as set forth by the user via the MLI tool, such as via the requesting module.

At processing block 506, the agent, in one embodiment, backups the GC output file by generating copies of the GC output file at a GC output file. The agent copies the GC output file in accordance with the predetermined criteria (e.g., predetermined intervals, predetermined events) as provided by the user. The user may also request a single copy via the agent without relying on any predetermined criteria. Stated differently, these backup files may be requested by the user via the MLI agent at the MLI tool merely once or multiple times manually, upon occurrence of one or more events, or in accordance with a set of predetermined time intervals as set forth. The copying of the GC output file into more or more backup files provides insurance against losing all data in case of an OOME or a system failure of some sorts. These copies are provided at a backup file directory at the file system at processing block 508. At processing block 510, once at least a single backup copy of the GC output file is made available, the MLI analyzer may be triggered to compare and analyze various histograms (e.g., the first histogram with the last histograms) to identify classes and corresponding objects causing memory leaks. Such classes and their associated objects are identified at processing block 512 and the results of the comparison and analysis are provided via various reports (e.g., bytes reports, instances reports, memory amount reports, etc.) at a reports directory.

The server (e.g., server 106 of FIG. 1) may include a J2EE server or node, which supports Enterprise Java Bean ("EJB") components and EJB containers (at the business layer) and Servlets and Java Server Pages ("JSP") (at the presentation layer). The VM (e.g., VM 104 of FIG. 1) may include a Java virtual machine. It is understood that processes taught by the discussion above can be practiced within various software environments such as, for example, object-oriented and non-object-oriented programming environments, Java based environments (such as a J2EE environment or environments defined by other releases of the Java standard), other environments (e.g., a .NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules within or associated with MLI tool (e.g., MLI tool 110 of FIG. 1) may include hardware, software, and a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 6:
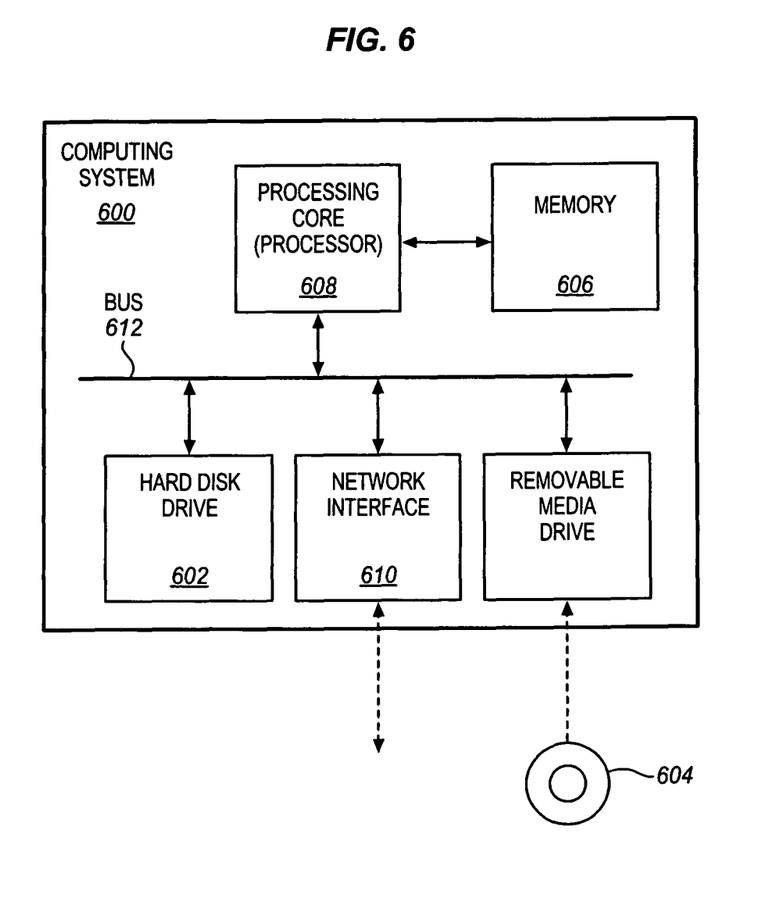
FIG. 6 illustrates a computing system.

FIG. 6 illustrates a computing system 600. Computing system 600 may be used for implementing one or more embodiments of the present invention and for executing program code stored by an article of manufacture. It is important to recognize that the computing system 600 represents merely of various computing system architectures that can be used for the same purposes. The applicable article of manufacture may include one or more fixed components (such as hard disk drive 602 or memory 606) and/or various movable components, such as compact disk (CD) ROM 604, a compact disc, a magnetic tape, and the like. To execute the program code, typically instructions of the program code are loaded into RAM 606. Then, processing core 608 executes the instructions. A processing core may include one or more processors and a memory controller function. A virtual machine or "interpreter" (e.g., a JVM) may run on top of the processing core (architecturally speaking) to convert abstract code (e.g., Java bytecode) into instructions that are understandable to the specific processor(s) of processing core 608. Computing system 600 further includes network interface 610 and bus 612 to connect to other systems via a network and to have various components communicate with each other, respectively.

Figure 7:
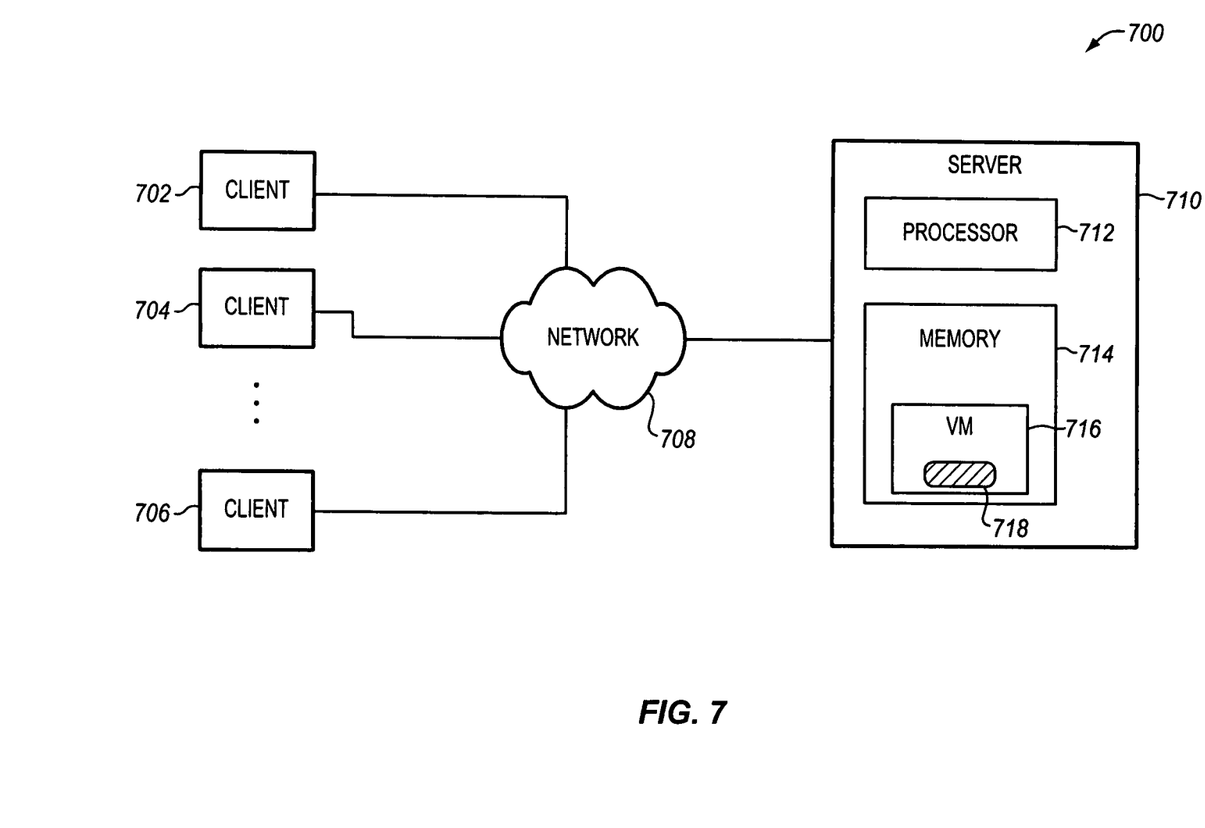
FIG. 7 illustrates a client/server network system employing a memory leaks inspector tool.

FIG. 7 illustrates a client/server network system 700 employing a memory leaks inspector tool 718. As illustrated, network 708 links server 710 with client systems 702-706. Server 710 includes programming data processing system suitable for implementing apparatus, programs, and/or methods in accordance with one or more embodiments of the present invention. Server 710 includes processor 712 and memory 714. Server 710 provides a core operating environment for one or more runtime systems (e.g., VM 716) at memory 714 to process user requests. Memory 714 may include a shared memory area that is accessible by multiple operating system processes executing in server 710. For example, VM 716 may include an enterprise server (e.g., a J2EE-compatible server or node, Web Application Server developed by SAP AG, WebSphere Application Server developed by IBM Corp. of Armonk, N.Y., and the like). The enterprise server at VM 716 may host memory leaks inspector tool 718. Memory 714 can be used to store an operating system, a Transmission Control Protocol/Internet Protocol (TCP/IP) stack for communicating over network 708*m*, and machine executable instructions executed by processor 712. In some embodiments, server 710 may include multiple processors, each of which can be used to execute machine executable instructions.

Client systems 702-706 may execute multiple application or application interfaces. Each instance or application or application interface may constitute a user session. Each user session may generate one or more requests to be processed by server 710. The requests may include instructions or code to be executed on a runtime system, such as VM 716, on server 710, such as the requests made via MLI tool 718 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A method comprising:
 monitoring a runtime system environment to detect memory leaks within the runtime system environment having runtime systems, the monitoring including:
  executing a garbage collecting process in a runtime system at least once to:
   release memory allocated within the runtime system for already inaccessible object instances; and
   writing, to a garbage collection file having memory leak information, memory leak information identifying first objects causing first memory leaks in the runtime system, the memory leak information providing a state of the first objects as they existed prior to causing the first memory leaks, the memory leak information further including memory space allocated to the first objects, pending method calls, and classes associated with the first objects;

periodically duplicating the garbage collection file into a duplicate garbage collection file capable of serving as a backup file to the garbage collection file; and during runtime, analyzing the duplicate garbage collection file having the memory leak information relating to the first objects to identify second objects capable of causing second memory leaks, and removing the second objects from an application prior to occurrence of the second memory leaks.

2. The method of claim 1, further comprising displaying the memory leak information and results of the analyzing of the memory leak information on a display device via a HyperText Markup Language (HTML) format or an Extensible Markup Language (XML) format.

3. The method of claim 1, wherein the memory leak information is provided as histograms, wherein the analyzing of the memory leak information includes reviewing a number of bytes associated with the first objects provided via a histogram.

4. The method of claim 3, further comprising reviewing a number of instances associated with the first objects provided via the histogram.

5. A system comprising:

a server including a computer system having a processor and a memory coupled with the processor, the memory having a runtime system environment including runtime systems, the server having an application server to monitor the runtime system environment to detect memory leaks, the monitoring including:

executing a garbage collecting process in a runtime system at least once to:

release memory allocated within the runtime system for already inaccessible object instances; and writing, to a garbage collection file having memory leak information, memory leak information identifying first objects causing first memory leaks in the runtime system, the memory leak information providing state of the first objects as they existed prior to causing the first memory leaks, the memory leak information further including memory space allocated to the first objects pending method calls, and classes associated with the first objects;

periodically duplicating the garbage collection file into a duplicate garbage collection file capable of serving as a backup file to the garbage collection file; and during runtime, analyzing the duplicate garbage collection file having the memory leak information relating to the first objects to identify second objects capable of causing second memory leaks, and removing the second objects from an application prior to occurrence of the second memory leaks.

6. The system of claim 5, further comprising a display device coupled with the computer system, the display device to display the memory leak information and results of the analyzing of the memory leak information via a HyperText Markup Language (HTML) format or an Extensible Markup Language (XML) format.

7. A machine-readable storage medium having instructions which, when executed, cause a machine to:

monitor a runtime system environment to detect memory leaks within the runtime system environment having runtime systems, the monitoring including:

executing a garbage collecting process in a runtime system at least once to:

release memory allocated within the runtime system for already inaccessible object instances; and writing, to a garbage collection file having memory leak information, memory leak information identifying first objects causing first memory leaks in the runtime system, the memory leak information providing state of the first objects as they existed prior to causing the first memory leaks, the memory leak information further including memory space allocated to the first objects, pending method calls, and classes associated with the first objects;

periodically duplicating the garbage collection file into a duplicate garbage collection file capable of serving as a backup file to the garbage collection file; and during runtime, analyzing the duplicate garbage collection file having the memory leak information relating to the first objects to identify second objects capable of causing second memory leaks, and removing the second objects from an application prior to occurrence of the second memory leaks.

8. The machine-readable storage medium of claim 7, wherein the memory leak information and results of the analyzing of the memory leak information are displayed via a HyperText Markup Language (HTML) format, or an Extensible Markup Language (XML) format.

* * * * *